United States Patent [19]

Schuermann

[11] Patent Number: 4,726,051
[45] Date of Patent: Feb. 16, 1988

[54] CORDLESS TELEPHONE

[75] Inventor: Josef H. Schuermann, Oberhummel, Fed. Rep. of Germany

[73] Assignee: Texas Instruments Incorporated, Dallas, Tex.

[21] Appl. No.: 679,726

[22] Filed: Dec. 10, 1984

[30] Foreign Application Priority Data

Dec. 22, 1983 [DE] Fed. Rep. of Germany ....... 3346480
Dec. 22, 1983 [DE] Fed. Rep. of Germany ....... 3346531

[51] Int. Cl.$^4$ .............................................. H04M 1/00
[52] U.S. Cl. .......................................... 379/60; 379/63; 455/54
[58] Field of Search ............... 179/2 E, 2 EA; 455/58, 455/77, 76; 379/61, 62

[56] References Cited

U.S. PATENT DOCUMENTS

| | | | |
|---|---|---|---|
| 3,509,462 | 4/1970 | Ertman | 455/77 |
| 4,197,498 | 5/1980 | Fukui et al. | 455/77 |
| 4,287,599 | 9/1981 | Goncharoff et al. | 455/77 |
| 4,404,685 | 9/1983 | Rogers | 455/76 |
| 4,446,564 | 5/1984 | Pierce | 375/8 |

Primary Examiner—Robert Lev
Attorney, Agent, or Firm—Gary C. Honeycutt; N. Phys Merrett; Melvin Sharp

[57] ABSTRACT

A cordless telephone is described comprising a fixed part which includes a reception section for receiving exact reception channel frequencies lying in a predetermined frequency range at equal intervals apart and a transmission section for transmitting exact transmission channel frequencies lying at a predetermined duplex interval from the reception channel frequencies. The cordless telephone further comprises a mobile part which includes a reception section for receiving frequencies lying in the range of the transmission channel frequencies of the fixed part and a transmission part for transmitting frequencies lying in the range of the reception channel frequencies of the fixed part. The mobile part includes a frequency control loop which using the transmission channel frequency transmitted by the fixed part as reference frequency holds its reception section fixedly tuned to the received transmission channel frequency. For initiating the communication setup by a call initiated by the mobile part the latter first transmits an arbitrary frequency accompanied by an identification code within the predetermined frequency range. Thereupon the fixed part transmits a transmission channel frequency accompanied by the identification code, whereupon the frequency control loop of the mobile part after reception of the transmission channel frequency and after detecting the identification code holds the reception section of the mobile part fixedly tuned to the received frequency. Furthermore, calibration methods are described with which it can be ensured that shifts of the operating frequency range of the mobile part can be compensated.

22 Claims, 2 Drawing Figures

CORDLESS TELEPHONE

The invention relates to a cordless telephone comprising a fixed part which includes a reception section for receiving exact reception channel frequencies lying in a predetermined frequency range at equal intervals apart and a transmission section for transmitting exact transmission channel frequencies lying at a predetermined duplex interval from the reception channel frequencies, and a mobile part which includes a reception section for receiving frequencies lying in the range of the transmission channel frequencies of the fixed part and a transmission part for transmitting frequencies lying in the range of the reception channel frequencies of the fixed part. In a cordless telephone, between a stationary part, the so-called fixed part, which is connected directly like an ordinary telephone to an exchange line of the public telephone network, and a portable compact unit, the so-called mobile part, a communication is established by transmission of high frequency signals when a telephone call is in progress. According to the regulations valid at present for establishing a duplex connection between a fixed part and a mobile part 40 duplex frequencies are available which are associated with 40 channels. The duplex frequencies of channel no. 1 lie for example at 914.0125 MHz and 959.0125 MHz. The former transmission frequency is the transmission channel frequency of the mobile part, whilst the second frequency mentioned is the transmission channel frequency of the fixed part. The frequencies provided for channel no. 40 are 914.9875 MHz and 959.9875 MHz. It is apparent from these figures that the channel interval is 25 kHz whilst the duplex interval is 45 MHz. Very high demands are made of the accuracy and constancy of the channel frequencies transmitted by the fixed part and by the mobile part. The circuit steps required in order to satisfy these demands can lead to a considerable increase in the costs of a cordless telephone. Due to the great power consumption of the circuits in prior art cordless telephones relatively large and heavy batteries or accumulators are required in the mobile part which are expensive and increase the weight of the mobile part.

With the aid of the invention a cordless telephone is to be provided with which with the simplest possible means the accuracy and the constancy of the frequencies transmitted by the mobile part and by the fixed part are achieved. The mobile part is to be designed so as to be particularly light and handy, so that it can easily be carried by the user. According to a further aspect the cordless telephone according to the invention is to be constructed such that the frequencies transmitted by the mobile part can be calibrated. Furthermore, a method is to be provided with which in simple manner a communication can be established between the fixed part and the mobile part of the cordless telephone using the exact transmission channel frequencies fixedly associated with the individual channels.

An embodiment of the cordless telephone according to the invention is characterized in that the mobile part includes a frequency control loop which using the transmission channel frequency transmitted by the fixed part as reference frequency holds its reception section fixedly tuned to the received transmission channel frequency. In this design of the cordless telephone according to the invention only the fixed part contains components which permit it to transmit and receive the frequencies associated with the individual channels with exact values. In contrast, the mobile part utilizes the fact that the fixed part transmits exact frequency values by employing the received frequencies in each case as reference frequency in a frequency control loop. The reception channel frequency coinciding in this manner exactly with the exact transmission channel frequency transmitted by the fixed part can then also be used in the mobile part to define by a frequency displacement through the duplex interval the transmission channel frequency transmitted by the mobile part. Since in order to meet the accuracy demands the mobile part thus only requires a simple frequency control loop, it can be made in simple manner and thus inexpensively. This is a particular advantage with regard to the mobile part because it enables the users to employ with one fixed part for example several mobile parts which are then immediately available at any time in several rooms of a house or office.

The method according to the invention for establishing a connection between the fixed part and the mobile part of the cordless telephone resides in that to initiate establishment of a communication by a call initiated by the mobile part the latter firstly transmits an arbitrary frequency accompanied by the identification code and lying within the predetermined frequency range, that the fixed part after receiving said arbitrary frequency and recognizing the identification code transmits an exact transmission channel frequency accompanied by the identification code and that the frequency control loop of the mobile part after receiving the transmission channel frequency and recognizing the identification code holds the reception section of the mobile part fixedly tuned to the received frequency. This method makes it possible to initiate a telephone connection from the mobile part as well and nevertheless to achieve that the communication between the mobile part and the fixed part is maintained using the exact channel frequencies. In the initiation of a telephone connection, using an arbitrary frequency lying in the predetermined frequency range the mobile part merely informs the fixed part that a telephone connection is desired, whereupon the fixed part then transmits an exact channel frequency which can be utilized by the mobile part as reference frequency in its frequency control loop. After this exchange of signals the communication is then established with the aid of the exact channel frequencies.

In order that the establishment of the connection occurs as rapidly as possible and no tuning over a great frequency range is required, after the mobile part transmitted an arbitrary frequency to the fixed part, an embodiment of the invention is characterized in that the fixed part transmits after reception of the arbitrary frequency and detection of the identification code an exact channel frequency as close as possible to the arbitrary frequency and that the mobile part for tuning to the channel frequency emitted by the fixed part carries out a sweep of its reception section through a section of the predetermined frequency range which includes some channel frequencies lying above and below the received channel frequency.

A further advantageous development of the cordless telephone according to the invention is characterized in subsidiary claim 2. This development contributes to costs reduction in that the energy consumption in the mobile part is greatly reduced because the components required for carrying out the search operations are set in operation only briefly with relatively long pauses in order to carry out one search operation in each case. During the pauses between the search operations the current consumption of the circuit units in the mobile part is very small so that in said mobile part relatively small and thus inexpensive batteries or accumulators may be used. The total weight and the dimensions of the mobile part can thus be considerably reduced.

To permit calibration of the frequencies to be transmitted by the mobile part a further development of the cordless telephone is characterized in that in the mobile part an additional control voltage generator is provided which is driven by the control circuit and the output voltage of which is not influenceable by the frequency control signal, that for comparing the control voltage with the output voltage of the additional control voltage generator a comparator is provided, that in the control circuit for each channel frequency to which the mobile part can be tuned a characteristic parameter is stored, said characteristic parameter defining the frequency to which the mobile part is to be tuned by driving the control voltage generator by the control circuit, and that the characteristic parameters associated with the channel frequencies can be adjusted for calibraing the mobile part in dependence upon the result of the comparison carried out by the comparator.

A further embodiment of the invention is characterized in that the mobile part includes a calibration oscillator which is adjustable in its oscillation frequency by the control circuit and the output signal of which can be applied instead of a signal received by the fixed part to the input of the reception section of the mobile part. When this embodiment is used the mobile part can already transmit a frequency in the course of establishing a radio connection with the fixed part which frequency exactly corresponds to the channel frequency. This can be required when the transmission of arbitrary frequencies in the range assigned to the channel frequencies is not permitted by the postal authorities.

A method according to the invention for adjusting the oscillation frequency of the calibration oscillator in the mobile part of the cordless telephone is characterized the fixed part transmits a predetermined calibration channel frequency which corresponds to the desired oscillation frequency of the calibration oscillator, that the mobile part is tuned to the calibration channel frequency and held tuned, that to the input of the reception section of the mobile part the output signal of the calibration oscillator is applied, that then the frequency of said output signal is set so that it corresponds to the calibration channel frequency and that for reproduceable adjustment of the oscillation frequency of the calibration oscillator a characteristic parameter is stored in the mobile part. When this method is applied the oscillation frequency of the calibration oscillator is set to an exact channel frequency transmitted from the fixed part. In this way an element is present in the mobile part which can be used as reference in determining the channel frequencies to be transmitted from the mobile part.

The operating frequency range of the mobile part can be calibrated by calibration of the controllable oscillator contained in the mobile part with the aid of the calibration oscillator by use of a method according to the invention which is characterized in that to the input of the reception section of the mobile part the output signal of the calibration oscillator is applied having the calibration channel frequency, that the mobile part is tuned for the reception of the calibration channel frequency from the calibration oscillator and that the characteristic parameter resulting from this tuning operation is taken as a basis for updating the characteristic parameters stored in the mobile part and assigned to the other channel frequencies.

The features of the cordless telephone according to the invention can be applied generally in a radio communications system having main stations and extensions which can communicate with each other in duplex mode. The extensions can have the features associated with the mobile parts whilst the main stations are characterized by the features of the fixed part.

An example of the embodiment of the invention is illustrated in the drawings, wherein.

In a cordless telephone both the mobile part and the fixed part include a transmitter and a receiver which operate in duplex mode. To establish a communication between the mobile part and the fixed part 40 duplex channels are available, each channel including two frequencies spaced apart by the duplex interval of 45 MHz. The channel interval is 25 kHz. According to present regulations the frequencies of the first channel are 914.0125 MHz and 959.0125 MHz and the frequencies of the 40th channel are 914.9875 MHz and 959.9875 MHz. During the existence of a radio communication between the mobile part and the fixed part the mobile part transmits a signal with the lower frequency of the duplex channel and the fixed part transmits the corresponding duplex frequency, i.e. the frequency of the respective channel higher by 45 MHz.

Both the fixed part and the mobile part can be in a rest state and in an operating state. In the case of the fixed part the rest state is the state in which it does not receive any incoming call from the exchange line connected thereto. Correspondingly, in the case of the mobile part the rest state is the state in which said mobile part is not being used to establish a telephone connection. The operating state may be divided for both parts of the cordless telephone into two phases, i.e. an initiating phase in which a communication is established and a call phase in which the communication exists and the telephone conversation is conducted.

In the rest state both parts of the cordless telephone search the frequency range in which the channels no. 1 to no. 40 lie continuously for the presence of a channel frequency. In the initiation phase of the operating state the part of the cordless telephone from which the telephone connection is to be established searches the frequency range for the presence of a free channel, i.e. a channel in which no high-frequency signal is received but only noise. On detecting a free channel the part seeking to establish the telephone communication transmits the frequency associated with the free channel together with an identification which is received by the other part. After receiving and recognizing the identification the other part replies with the transmission of the duplex frequency associated with said channel and also the identification which is then received from said first part. A duplex connection between the two parts is thus established. The exact cycles of the individual operating states and operating phases will be apparent from the following description. The above remarks are only a very simplified explanation of these operating states and phases and are intended only to illustrate the basic behavior.

Figure 1:
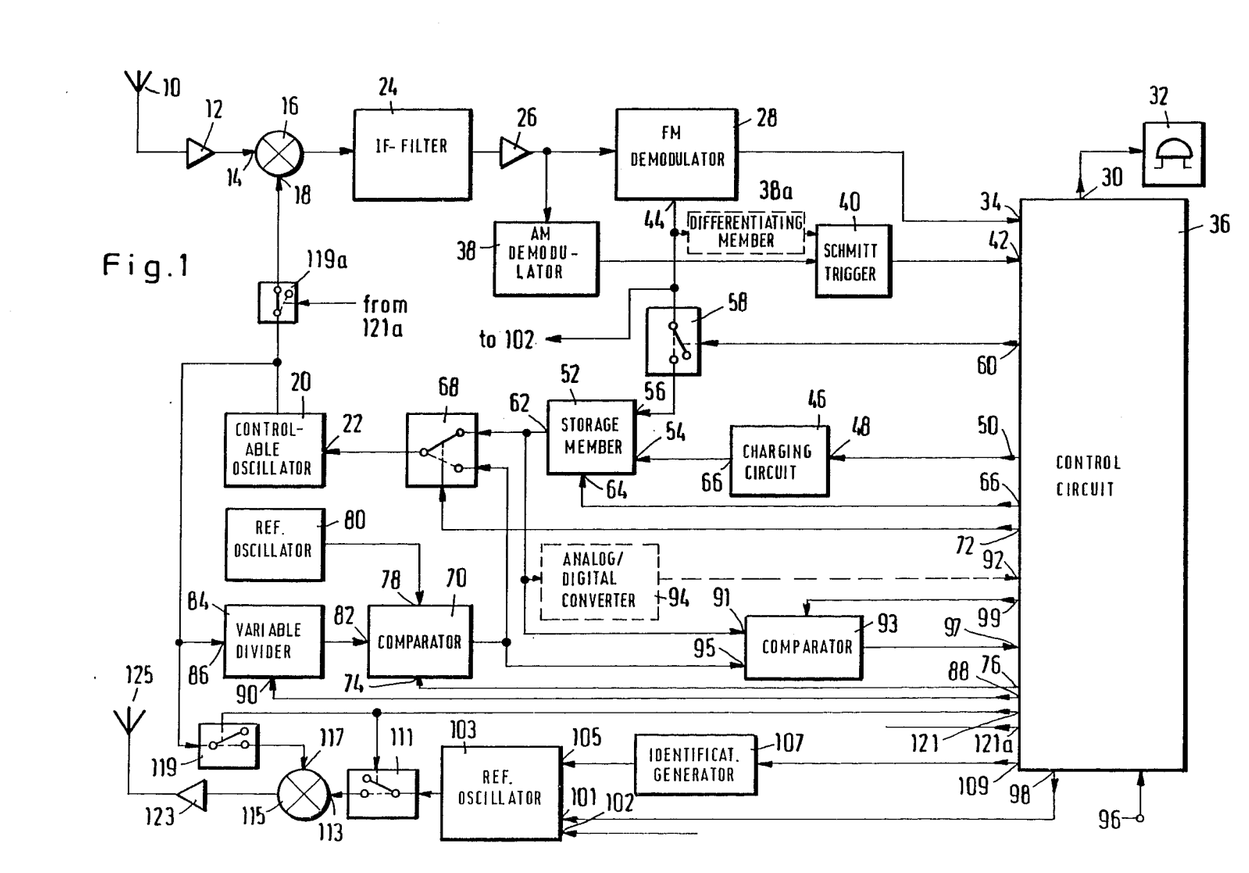
FIG. 1 is a block circuit diagram of the fixed part of a cordless telephone.

With reference to FIG. 1 the construction of the fixed part of the cordless telephone will now be explained. The fixed part includes an antenna 10 with which it can receive high-frequency signals. The antenna is connected to a high-frequency amplifier 12 whose output is in connection with an input 14 of a mixer 16. The mixer 16 receives at a further input 18 additionally the output signal of a controllable oscillator 20 whose output frequency can be varied by a voltage applied to its input 22. The output signals of the mixer 16 with the assumed intermediate frequency of 10.7 MHz are passed to an IF filter 24 and then to an IF amplifier 26. The output signals of the IF amplifier 26 pass to an FM demodulator 28 which subjects the signals supplied thereto to a frequency demodulation. The demodulated output signals of the FM demodulator 28 are supplied to the input 34 of a control circuit 36 for further processing.

The output signals of the IF amplifier 26 are also applied to an AM demodulator 38 where they are subjected to an amplitude demodulation. The output signals of the amplitude demodulator 38 pass to a Schmitt trigger 40 which supplies a control signal to an input 42 of the control circuit 36 whenever the signal supplied thereto by the AM demodulator 38 exceeds a predetermined threshold value.

The FM demodulator 28 has an output 44 where it emits the known S curve signal when the IF amplifier supplies to it a signal to be demodulated, and said S curve signal can be used for the frequency control as will be explained in detail below.

The fixed part also includes a charging circuit 46 which can be set in operation or out of operation by means of a control signal applied to its input 48 by the output 50 of the control circuit 36. Said charging circuit is a current source which can supply a constant charging current to a storage member 52, formed for example by a capacitor, at an input 54. The storage member 52 has a further input 56 at which from the output 44 of the FM demodulator 28 a charging current can be supplied thereto when a switch 58 included in the connection line between the output 44 and the input 56 is closed under the control of a control signal furnished by the output 60 of the control circuit 36. The charging circuit 46 and the storage member 52 form a control voltage generator which produces at the output 62 of the storage member 52 a control voltage rising from a predetermined initial value to a predetermined final value as long as the charging circuit 46 is kept in operation by the control signal at the output 50 of the control circuit. By means of a control signal applied to the input 64 of the storage member 52 by the output 66 of the control circuit 36 the storage member can be discharged after reaching the final value of the rising voltage so that a new charging cycle can begin.

The output 62 of the storage member 52 can be connected via a switch 68 to the input 22 of the controllable oscillator 20. However, the output of a comparator 70 may also be connected to the input 22 of the controllable oscillator 20, which is the case when the change-over switch 68 is switched into its position indicated in FIG. 1 in dashed lines. The control of the switch 68 is effected by means of a control signal furnished by the output 72 of the control circuit 36. The comparator 70 can be set in operation by means of a control signal applied to an input 74 by the output 76 of the control circuit 36. It comprises an input 78 at which it receives the output signals of a reference oscillator 80 and a further input 82 at which it receives the output signals of a variable divider 84. The variable divider is connected via an input 86 to the output of the controllable oscillator 20 and it divides the output frequency thereof in accordance with the particular division ratio set. The division ratio is set by a signal furhised by the control circuits 36 at the output 88 and applied to the input 90.

The reference oscillator 80, the comparator 70 and the variable divider 84 form a tuning voltage generator and when the switch 68 assumes the switching position shown in dashed lines with the controllable oscillator 70 form a so-called PLL circuit which has the property of keeping the output frequency of the controllable oscillator 20 constant by means of a tuning voltage furnished by the comparator 70. The frequency which the controllable oscillator 20 furnishes can be fixed by the particular division ratio set in the variable divider 84. The mode of operation of such a PLL circuit is known and therefore need not be explained in detail here.

Also connected to the output 62 of the storage member 52 is the input 91 of a comparator 93 which has a further input 95 connected to the output of the comparator 70. The comparator 93 compares the charging voltage furnished by the storage member 52 with the tuning voltage furnished by the comparator 70 and on identity of the two voltages applies a signal to the input 97 of the control circuit 36; the comparator 93 can be set in operation by means of a signal from the output 99 of the control circuit 36.

Between the output 62 of the storage member 52 and the input 92 of the control circuit 36 an analog/digital converter 94 may be inserted which converts the analog voltage furnished by the storage member to a digital signal. The purpose of this converter 94, on inclusion of which the comparator 93 may be omitted, will be explained in detail hereinafter.

The control circuit 36 is a microprocessor which is so programmed that at predetermined outputs it furnishes in predetermined sequence control signals and analyzes signals supplied to its inputs and evaluates them for the control of the signal emission at the outputs. The sequence of the signals evaluated and furnished by the microprocessor will be apparent from the following description of the mode of operation of the circuit arrangement illustrated in FIG. 1. In particular, a total of 40 values for the division ratio of the variable divider 84 are fixedly stored in the control circuit 36. This makes it possible by means of the PLL circuit to produce 40 different constant output frequencies of the oscillator 20 so that thereby 40 different frequencies can be received.

Via a connection 96 the control circuit 36 is connected to an exchange line of the public telephone network. The signals arriving at this line can under certain conditions be passed by the control circuit 36 to the output 98 and supplied to the input 101 of a reference oscillator 103. This oscillator is so constructed that its frequency can be modulated with the signals applied to the input 101. The frequency of the reference oscillator 103 can also be modulated with the aid of signals supplied to its input 105 by an identification generator 107 which can be set in operation by means of a control signal furnished by the output 109 of the control circuit 36. The output of the reference oscillator 103 can be connected by means of a switch 111 to the input 113 of a mixer 115 whose further input 117 can be connected by means of a switch 119 to the output of the controllable oscillator 20. The switches 111 and 119 are controlled by a signal furnished by the control circuit 36 at the output 121. The output signals of the mixer 115 are supplied via a high-frequency amplifier 123 to a transmission antenna 125.

In the description of the mode of operation of the fixed part of the cordless telephone illustrated in FIG. 1 it will first be assumed that the fixed part is in the rest state, i.e. a call is not being conducted and nor is a telephone communication with the mobile part to be established. In the rest state the fixed part scans the frequency range associated with the channel frequencies in successive cycles to determine whether high-frequency signals in the predetermined frequency range with identification are being received by the antenna 10. The switches 58, 68, 111, and 119 thereby assume the switching positions illustrated in full line. To initiate a search cycle the control circuit 36 furnishes at the output 50 a signal which sets in operation the current source contained in the charging circuit 46. The current delivered by the output 66 of the charging circuit 46 is supplied to the input 54 of the storage member 52 so that the capacitor contained therein is charged. The charging voltage is furnished by the storage member 52 at the output 62 and applied via the switch 68 to the control input 22 of the controllable oscillator 20. The voltage variation generated at the storage member 52 during the operating period of the charging circuit 46 is so dimensioned that the output frequency of the oscillator 20 during the increase of the charging voltage from its initial value to its final value varies in a frequency range such that at the antenna 10 the frequencies associated with the channel 1 to 40 can be received. If, as assumed, no channel frequency is being received by the antenna 10 the frequency sweep is continuously repeated by repeating the charging of the storage member 52 and before the start of each sweep the storage member 52 is discharged by means of a signal furnished by the control circuit 36 at the output 66 and applied to the input 64. The individual frequency sweeps can be carried out at high speed so that for example all 40 channel frequencies can be passed through in a period of about 30 ms or less. The sweep velocity is limited by the transient time of the IF filter 24; it must be slow enough for the IF filter 24 to furnish an evaluatable output signal when in the course of the frequency sweep a channel frequency is received by the antenna 10. With a bandwidth of the IF filter of 15 kHz the transient time is 70 $\mu$s so that theoretically 40 channels can be passed through in a time of 3 ms. With a sweep time of 10 to about 30 ms, therefore, the IF filter 18 can with certainty furnish an evaluatable output signal when a channel frequency is received. Since according to existing regulations the fixed part must be able within 3 seconds to recognize a channel frequency intended for it and accompanied by an identification code and to reply as reaction to the recognition with the transmission of the corresponding duplex frequency also accompanied by the identification code, between the individual frequency sweeps pauses of for example 2 seconds can readily be made. These frequency sweeps carried out at intervals of time for example of 2 seconds are continuously repeated by the fixed part in the rest state. To shorten the reaction time of the fixed part to a call coming from the mobile part the fixed part can also carry out the frequency sweeps in immediate succession without pause. This is readily possible because in the fixed part the power supply is not from batteries or accumulators but from the mains.

For an operating mode to be explained in detail hereinafter and occurring when a telephone call arrives at the exchange line in connection with the input 96 of the control circuit 36, said latter circuit 36 can set the charging circuit 46 briefly in operation so that the storage member 52 is not charged by a continous supply of current, the charging voltage arising at the storage member 52 increasing stepwise.

When the fixed part within a frequency sweep carried out continuously in the rest state receives a high-frequency signal at the antenna 10 the result is that the mixer 16 supplies to the IF filter 24 a signal with the intermediate frequency which is amplified by the IF amplifier 26 and supplied both to the FM demodulator 28 and to the AM demodulator 38. The AM demodulator 38 rectifies the signal supplied to it and applies to the Schmitt trigger 40 a signal which lies above the threshold value thereof. To detect the reception of an HF signal having a channel frequency, as an alternative to the AM demodulator 38 a differentiating member 38a could be used to which the output signal of the FM demodulator 28 is applied. The differentiating member 38a responds to the rise of the signal at the output of the FM demodulator 28 and when this signal rises furnishes a pulse to the Schmitt trigger 40 which causes the latter to respond because in the case assumed its level is above the trigger threshold. On response of the Schmitt trigger 40 a defined signal is applied to the input 42 of the control circuit 36. For the control circuit 36 this signal is the indication that the antenna 10 has received an HF signal. The immediate reaction to this is the emission of a signal at the output 60 by the control circuit 36 which brings the switch 58 into the switching position indicated in dashed line in which it connects the output 44 of the FM demodulator 28 to the input 56 of the storage member 52. Simultaneously, the charging circuit 46 is rendered inoperative by the control circuit 36. Switching of the switch 58 can also be effected only when the identification code has been determined in the course of the examination of the identification.

The FM demodulator 28 subjects the signal supplied thereto by the IF amplifier 26 to a frequency demodulation and furnishes at its output 44 the known S-curve signal which can be used for the frequency control. A suitable FM demodulator is for example the integrated circuit of the type Ser. No. 76670 of Texas Instruments which has an output furnishing the S-curve signal utilizable for the frequency control. This signal of course passes through the value 0 when the reception part is exactly tuned to the just demodulated frequency. On deviation from this frequency said S-curve signal effects via the input 56 of the storage member 52 an increase or decrease of the charging voltage generated thereby such that the output frequency of the controllable oscillator 20 is held constant exactly at the frequency which led to reception of the HF signal subjected to the demodulation. Thus, by closure of the switch 58 a frequency control loop is formed which is generally referred to as AFC loop.

Now that the reception part is fixedly tuned to the received HF signal, the control circuit 36 examines the signal supplied to its input 34 and subjected to a frequency demodulation for the presence of the identification code. If the control circuit 36 cannot detect the identification code, by furnishing a control signal at the output 60 it opens the switch 58 and by furnishing a further control signal at the output 50 again sets the charging circuit 46 in operation. The frequency sweep is thereby continued from the frequency at which it was previously interrupted. If however the control circuit 36 detects the identification code, this means that the incoming HF signal is a signal coming from the associated mobile part, i.e. a telephone communication is to be established from the mobile part.

Detection of the identification code effects that the control circuit 36 with the aid of control signals furnished at the outputs 76 and 99 sets the comparators 70 and 93 in operation. At the same time, the control circuit 36 begins via its output 88 to apply successively to the variable divider 84 the division ratios which are stored for the reception of the 40 channel frequencies in the control circuit 36. The divider 84 divides the output frequency of the oscillator 20 in each case according to the particular division ratio present and applies the divided frequency to the comparator 70. This comparator 70 furnishes a voltage which in the PLL circuit, which may be formed by the controllable oscillator 20, the reference oscillator 80, the variable divider 84 and the comparator 70, produces a constant output frequency of the oscillator 20. In the operating phase just outlined, however, the switch 68 still assumes the switching position shown in full line so that the PLL circuit is not yet connected together and the output voltage of the comparator 70 is not applied to the oscillator 20. The output frequency of the latter is determined by the charging voltage furnished by the storage member 52 at the output 62. The comparator 93 compares the charging voltage furnished at the output 62 of the storage member 52 with the voltage furnished by the comparator 70 and on detecting equality of these two voltages applies an output signal to the input 97 of the control circuit 36. The equality of the two voltages compared means that the variable divider 84 has been set by the control circuit 36 to a division ratio which holds the frequency of the oscillator 20 at the value which it has also reached on the basis of the charging voltage furnished by the output 62 of the storage member 52.

In the operation cycle described the division ratio to which the divider 84 must be set so that the oscillator 20 furnishes the frequency at which the tuning to the particular channel frequency received or a frequency lying in the neighborhood thereof is obtained was determined in that the control circuit 36 sets the divider 84 successively to various division ratios until the division ratio is found which led to the detection of the equality of the output voltage of the comparator 70 and the charging voltage that the output 62 of the storage member 52. In an alternative embodiment this division ratio can also be determined in another manner. For this purpose it is necessary to store in the control circuit 36 the association between the charging voltage furnished by the storage member 52 and the reception frequency which can be obtained therewith. By means of an analog/digital converter 94 shown in dashed line in FIG. 1 the control circuit 36 always receives at the input 92 a digital signal which corresponds to the charging voltage furnished by the storage member 52. On the basis of the association stored therein the control circuit 36 therefore knows at any time to which reception frequency the fixed part is tuned at that moment. As already mentioned, stored in the control circuit 36 are the 40 values of the division ratio of the divider 84 to which said divider must be set in each case to enable the 40 channel frequencies to be received. When the control circuit 36 has established with the aid of the output signal of the analog/digital converter 94 to which reception frequency the reception section of the fixed part is tuned at that moment, via its output 88 it can set the variable divider 84 to the division ratio associated with this reception frequency. It is therefore not necessary as in the case previously outlined to set firstly in succession various division ratios in the divider 84 and thereby to find utilizing the comparator 93 the division ratio associated with the particular frequency received. Consequently, in the alternative embodiment outlined the comparator 93 may be omitted.

When the divider 84 has been fixedly set in the manner described above the control circuit 36 furnishes at its output 72 a signal which switches the switch 68 into the switching position illustrated in dashed line. In this switching position the switch 68 connects the output of the comparator 70 to the control input 22 of the oscillator 20 so that the PLL circuit formed by the comparator 70, the controllable oscillator 20, the reference oscillator 80 and the variable divider 84 becomes effective and keeps the reception frequency constant.

When the reception part has been set with high accuracy to the particular frequency received the control circuit 36 furnishes at its output 121 a signal which brings the switches 111 and 119 into the switching position indicated in dashed line. As a result, the frequency furnished by the oscillator 20 and the frequency furnished by the reference oscillator 103 are mixed in the mixer 115. The oscillation frequency of the reference oscillator 103 is set to the difference between the duplex interval and the IF frequency, i.e. to 34.3 MHz (45 MHz-10.7 MHz).

The output frequency of the reference oscillator 103 may be modulated with the aid of signals which are supplied to the input 105 and the input 101. The output signals of the identification generator 107 are supplied to the input 105, said generator being activated by the control circuit 36 for the emission of the identification code as soon as the constant tuning of the reception part to the received channel frequency is completed. The signals supplied to the input 101 of the reference oscillator 103 for the frequency modulation are the signals coming from the exchange line connected at the input 96, which in the operation case outlined can be the free-line signal or the busy signal. The mixer 115 changes the output frequency of the controllable oscillator 20 to a frequency which is 34.3 MHz higher than the output frequency of the oscillator 20, the signal supplied to the high-frequency amplifier 123 and the antenna 125 being frequency modulated with the identification code and with signals coming from the exchange line.

As was mentioned, the mobile part in its rest position scans the frequency range associated with the channel frequencies in successive cycles to determine whether from the antenna 10 high frequency signals within the predetermined frequency range are received together with the identification. To this end the controllable oscillator 20 must be controlled by means of the voltage emitted from the storage member 52 in such a manner that it tunes the reception section of the fixed part to receive channels 1 to 40 one after the other. However, since the voltage/frequency characteristic of the frequency determining components in the oscillator 20 can shift due to ageing or also due to temperature variations, the frequency range through which the reception section is tuned during a search procedure can also shift for the above reasons. This displacement could, for example, have the consequence that the search operation does not begin with the frequency associated with channel 1, but only with the frequency associated with channel 3 and does not stop at a frequency associated with channel 40, but only at a higher frequency. The calibration operation to be described in the following serves to compensate for possibly occurring displacements of the voltage/frequency characteristic of the controllable oscillator 20.

For effecting a calibration operation, which is automatically carried out by the fixed part in regular intervals, the control circuit 36 brings the switch 119 into the switching position shown in a solid line, in that said control circuit furnishes a corresponding signal at the output 121. By means of a signal at the output 121a it brings switch 119a into the switching position shown in a broken line. By means of a signal at the output 72 it switches the switch 68 into the switching position shown in a broken line. The PLL-circuit formed of the controllable oscillator 20, the reference oscillator 80, the comparator 70 and the switch 68 is thereby separated from the antenna 10 on the receiving side and from the antenna 125 on the transmitting side. In the control circuit 36 counts are stored for each channel frequency to which the fixed part can be tuned, said counts each indicating a certain number of pulses, which have to be furnished at output 50, so that via the charging circuit 46, the storage member 52 and the oscillator 20 the desired tuning to the corresponding channel frequency is achieved. For example, the count 10 is stored for channel 1 this count meaning that the control circuit 36 has to furnish 10 pulses at output 50 in order to effect the tuning to channel 1. For channel 40, for example, the count 400 can be stored so that the tuning to channel 40 is achieved by delivery of 400 pulses at the output 50. Because of the before-mentioned displacement of the voltage/frequency characteristic of the controllable oscillator 20, it may occur that the stored counts are no longer sufficient to provide a tuning to the desired channel frequency which means that, for example, for tuning to channel 1 a total of 12 pulses have to be furnished at output 50, in order to produce the corresponding output frequency at the controllable oscillator 20. By means of the initiated calibration operation the stored counts can be corrected in consideration of a displacement of the voltage/frequency characteristic of oscillator 20.

Following actuation of switches 68, 119 and 119a the control circuit 36 sets the variable divider 84 to the dividing ratio associated with channel 1. This results in that the comparator 70 at its output delivers a voltage which is applied to the control input 22 of the controllable oscillator 20 via the switch 68. By this voltage the oscillator 20 is tuned to a frequency, resulting in the normal operation of the fixed part in a tuning to channel 1. The output voltage of the comparator 70 is also applied to input 95 of comparator 93. The control circuit 36 simultaneously furnishes pulses at output 50 for a duration until the output voltage delivered from the storage member 51 and applied to input 91 of comparator 93 is equal to the voltage applied to input 95. When this identity is determined comparator 93 applies a corresponding signal to input 97 of control circuit 36.

If no displacement of the voltage/frequency characteristic of controllable oscillator 20 has occurred, the number of pulses furnished at output 50 corresponds to the count associated with channel 1. THerefore, control circuit 36 does not have to correct this count.

The same operation is not repeated for channel 40 and since, as was assumed, no displacement of the voltage/frequency characteristic of oscillator 20 has occurred, control circuit 36 does not have to change the count associated with channel 40 either.

Now it is assumed that a displacement of the voltage/frequency characteristic of controllable oscillator 20 has taken place. For effecting the calibration operation control circuit 36 again sets variable divider 84 to the divider ratio associated with channel 1 so that comparator 70 emits a corresponding voltage, which tunes oscillator 20 to the frequency associated with channel 1. By emission of pulses by control circuit 36 at output 50 a voltage is also produced again at the output of storage member 62 which voltage is applied to input 91 of comparator 93.

The control circuit 36 furnishes pulses at output 50 for such a duration until comparator 93 determines identity of the voltages applied to its inputs. Due to the assumed displacement of the characteristics the number of pulses furnished at output 50 when identity is determined does not correspond to the count associated with channel 1. Control circuit 36 therefore corrects the count associated with channel 1 to the value corresponding to the number of pulses furnished. Thus it is ensured that also following a frequency displacement in normal operation, i.e. when the search operation is effected by the voltage applied to the controllable oscillator 20 by the storage member 52, the search operation always starts with channel 1. The same operation is carried out for channel 40, so that the number of pulses is ascertained which have to be furnished at output 50 in order to achieve the tuning to channel 40. The count associated with channel 40 is also corrected in control circuit 36.

The counts stored in the control circuit 36 for the other channel frequencies can be correspondingly corrected in consideration of the counts determined for channel 1 and for channel 40 by the calibration operation. In this manner it is ensured that the fixed part always scans the predetermined frequency range to its full extent to determine the presence of high frequency signals with identification.

Hereinafter, the construction of the mobile part will be explained in detail with reference to FIG. 2 and the operations taking place in the rest state of the mobile part will be described.

The mobile part includes an antenna 110 with which it receives high-frequency signals. The antenna is connected to a high-frequency amplifier 112 whose output is connected to an input 114 of a mixer 116. The mixer 116 receives at a further input 118 also the output signal of a controllable oscillator 120 after the frequency thereof has been tripled in a frequency multiplyer 121. The output frequency of the controllable oscillator 120 can be controlled by a voltage applied to its input 122. The output signals of the mixer 116 are supplied to a first IF filter 124 and then to a further mixer 131. The mixer 131 also receives the output signals of a reference oscillator 133 after a frequency triplication with a frequency multiplier 135. The output frequency of the reference oscillator 133 is 45 MHz The output signals of the mixer 131 are also supplied to a second IF filter 129. The output signals of the IF filter 129 pass to an FM demodulator 128 which subjects the signals supplied thereto to a frequency demodulation. The output signals of the FM demodulator 128 are applied to an AF amplifier 30 which amplifies them and supplies them to a loudspeaker 132. The demodulated output signals of the FM demodulator 128 are also supplied to the input 134 of a control circuit 136. The control circuit 136 is a microprocessor which like the microprocessor forming the control circuit 36 of the fixed part is so programmed that it furnishes at predetermined outputs in predetermined sequence control signals and analyzes signals supplied to its inputs, evaluating said signals for the control of the signal emission at the outputs. The signals which are received and emitted by the control circuit 136 and the sequence of the reception and emission are apparent from the following description.

The output signals of the second IF amplifier 129 are also applied to an AM demodulator 136 in which they are subjected to an amplitude demodulation. The output signals of the amplitude demodulator 128 pass to a Schmitt trigger 140 which supplies a control signal to an input 142 of the control circuit 136 whenever the signal supplied thereto by the AM demodulator 138 exceeds a predetermined threshold value.

As in the fixed part, in the mobile part as well to detect the reception of an HF signal with a channel frequency a differentiating member 138a can be used as alternative to the AM demodulator 138. As soon as the output pulse of this differentiating member 138a lies above a predetermined level, which is the case when the FM demodulator demodulates a signal having a channel frequency, the Schmitt trigger 140 is actuated.

The FM demodulator 128 has an output 144 where it emits the known S-curve signal when the IF filter 129 supplies to it a signal to be demodulated, and said S-curve signal can be used for the frequency control as will be explained in detail below.

The mobile part also includes a charging circuit 146 which can be set in operation or out of operation by means of a control signal applied to its input 148 by the output 150 of the control circuit 136. Said charging circuit 146 is a current source which can supply a constant charging current to a storage member 152, formed for example by a capacitor, at an input 154. The storage member 152 has a further input 156 at which from the output 144 of the FM demodulator 128 a charging current can be supplied thereto when a switch 158 included in the connection line between the output 144 and the input 156 is closed under the control of a control signal furnished by the output 160 of the control circuit 136. The charging circuit 146 and the storage member 152 form a control voltage generator which produces at the output 162 of the storage member 152 a voltage rising from a predetermined initial value to a predetermined final value as long as the charging circuit 146 is kept in operation by the control signal at the output 150 of the control circuit 136. For a purpose still to be explained, the control circuit 136 can keep the charging circuit 146 by means of the output signal at the output 150 in operation so long that the charging voltage arising at the storage member 152 rises in a continous passage from the initial value to the final value. In another operating state, however, the control circuit 136 can set the charging circuit 146 in operation only for a short time so that the charging voltage at the storage member 152 does not increase continuously but in fixed steps from the initial value to the final value. In this operating state a staircase voltage is furnished at the output 162 of the storage member 152. By means of a control signal supplied to the input 164 of the storage member 152 by the output 165 of the control circuit 136 the storage member 152 can be discharged on reaching the final value of the rising voltage so that a new charging cycle can begin.

In FIG. 1 switch 230 and an intermediate storage member 152b are inserted between output 162 of the storage member 152 and input 122 of the controllable oscillator 120. In the switching position of switch 230 shown in a solid line in FIG. 1 the output voltage of storage member 152 reaches the intermediate storage member 152b and input 122 of oscillator 120. Switch 230 and the intermediate storage member 152b are necessary for carrying out an embodiment of a calibration operation yet to be described, but are of no importance in the usual operation of the mobile part, i.e. in establishing telephone connections and in receiving telephone calls.

The mobile part contains a component referred to as cradle switch 166 which is actuated by the person using the mobile part when he wishes to conduct a call by means of said part. The function of this component corresponds to the function of the cradle switch of a conventional subscriber telephone set. In the actuated condition the cradle switch 166 emits a control signal to the input 168 of the control circuit 136 which notifies the latter of the actuation of the cradle switch.

The transmission section of the mobile part includes a reference oscillator 170 whose output frequency can be modulated by the output signals of an identification generator 172 and the output signals of an amplifier 174 which amplifies output signals of a microphone 176 as well as by output signals of a dialing signal generator 196. The identification generator 172 is activated by control signals from the output 178 of the control circuit 136. The output signals of the reference oscillator 170 are supplied via a switch 180 to a mixer 182 whose output signals are supplied to an HF amplifier 1866 and an antenna 188. The mixer 182 also receives via a switch 190 the same signals which are also supplied to the input 118 of the mixer 116. The switches 180 and 190 are controlled by a control signal which is furnished by the output 192 of the control circuit 136.

In the rest state the mobile part performs substantially the same operations which have already been described in conjunction with the fixed part. This means that the reception section under the control of the control circuit 136 is continuously tuned through the range of the channel frequencies so that the presence of a channel frequency intended for the mobile part can be detected. As with the fixed part the tuning sweep is by variation of the frequency of the controllable oscillator 120 under the influence of the charging voltage furnished by the storage member 152. The fact that in the reception branch by means of the first mixer 116 a conversion is first carried out to a first intermediate frequency and by means of the mixer 131 a conversion to a second intermediate frequency does not change the basic behavior.

If during a sweep operation a channel frequency is received this initiates the stopping of the sweep operation in that firstly the AM demodulator 138 in cooperation with the Schmitt trigger 140 supplies to the control circuit 136 a signal which is characteristic for the reception of a channel frequency at the antenna 110. The resulting interruption of the operation of the charging circuit 146 and the closing of the switch 158 effects that the reception frequency is kept constant with the known utilization of the S-curve signal furnished by the FM demodulator 128 at the output 144. If the investigation of the demodulated signal from the FM demodulator 128 supplied to the input 134 of the control circuit 136 shows that this signal does not contain the identification code allocated to the mobile part, the tuning sweep is continued.

If however the identification code is recognized, which means that the received channel frequency was transmitted by the associated fixed part because a call has arrived at the exchange line, the control circuit 136 furnishes at the output 192 a control signal which closes the two switches 80 and 190. At the same time, the identification generator 172 is set in operation so that the output frequency of the reference oscillator 170 is modulated with the identification code. In the mixer 182 the output frequency of the reference oscillator 170 is mixed with the output frequency of the controllable oscillator 120 triplicated in the frequency multiplier 121 and applied to the antenna 188 via the amplifier 186. The signal radiated by the antenna 188 and modulated with the identification code is received by the fixed part at the antenna 10; after recognition of the identification code at the input 34 of the control circuit 36 of the fixed part the radio communication between the fixed part and the mobile part is established and the control circuit 36 switches the signals arriving at the exchange line connected to the input 96 through to the output 90 so that they modulate the frequency furnished by the reference oscillator 103 and after a conversion in the mixer 116 are radiated by the antenna 125. At the same time it activates by emitting a signal at the output 30 the bell 32 to draw the attention of the called subscriber to the incoming call. The previous description both of the fixed part and of the mobile part related in each case firstly to the rest state in which a telephone communication is not present or is not being initiated and secondly to the case where the telephone communication was initiated by the respective other part. The following description relates to the operations in the fixed part and in the mobile part which take place when a telephone communication is to be established from these parts.

If a communication is to be initiated from the fixed part, this means that call signals are arriving at the exchange line in connection with the terminal 96 of the control circuit 36. The control circuit 36 recognizes the arrival of the call signals and as a result the fixed part goes from the rest state to the initiating phase of the operating state in which the communication with the mobile part is to be established. For establishing the communication with the mobile part the fixed part must transmit a signal modulated with the identification code and having a channel frequency which is then received by the mobile part and due to the identification can be recognized as coming from the fixed part. However, before transmitting the channel frequency the fixed part must find a free frequency so that it does not start transmitting with a frequency which is possibly occupied by a neighboring cordless telephone. According to the present regulations a frequency is considered free if during the reception thereon for a period of 100 ms no signal exceeding a predetermined level is received. The control circuit 36 can determine this with the aid of the signal applied to its input 42 by the Schmitt trigger 40. Whereas in the rest state the output signal of the Schmitt trigger 40 is examined to determine whether it exceeds a predetermined level, in the initiation phase of the operating state this signal must be examined to determine whether it remains beneath a predetermined level for a predetermined time. The control circuit 36 switches to this other mode of evaluation of the output signal of the Schmitt trigger as soon as it receives at its connection 96 call signals from the exchange line.

With the reception of call signals at the connection 96 the control circuit 36 sets the charging circuit 46 intermittently into operation with short successive pulses so that the storage member 52 is charged stepwise and generates at its output 62 a control voltage rising in staircase manner for the oscillator 20. As a result, the controllable oscillator 20 in the initiating phase tunes the reception section of the fixed part stepwise successively to different reception channels. To enable the control circuit 36 to conduct the examination whether a reception channel is free or occupied, each tuning step lasts at least 100 ms so that the aforementioned regulation can be complied with.

As soon as the control circuit 36 establishes that the output signal of the Schmitt trigger 40 at a tuning step remains beneath a predetermined level for at least 100 ms, this means that the reception frequency then present is free so that said frequency can be used to establish the communication with the mobile part. To determine the value of the frequency which has been recognized as free in the fixed part the process already described in conjunction with the rest state and taking place when the fixed part in the rest state receives an HF signal accompanied by the identification code is employed. In this process the control circuit 36 sets the variable divider 84 successively to the division ratios associated with the individual channel frequencies and the output signal of the comparator 70 is compared in the comparator 93 with the charging voltage furnished by the storage member 52 until for a given division ratio of the variable divider 84 the equality of the signals compared is detected. As in the rest state this means that the voltage furnished by the comparator 70 and the voltage furnished by the storage member 52 are identical so that the control circuit 36 can switch the switch 68 into the switching position illustrated in dashed line so that the aforementioned PLL circuit becomes active and keeps the frequency furnished by the controllable oscillator 20 constant. As an alternative, as in the rest state the analog/digital converter 94 could be used for the determination of the frequency to which the controllable oscillator is tuned so that the comparator 93 could be omitted.

Simultaneously with the switching of the switch 68 the switches 111 and 119 are brought by a signal emitted by the output 121 of the control circuit 36 into the switching positions shown in dashed line and the identification generator 107 is activated by a signal emitted by the output 109 of the control circuit so that the output signals thereof are supplied to the input 105 of the reference oscillator 103 and modulate the signals emitted by the latter. By closure of the switches 111 and 119 the output signals of the controllable oscillator 20 and of the reference oscillator 103 are supplied to the mixer 115 and the output signals of the mixer are radiated by the antenna 125 after amplification in the high-frequency amplifier 123. The mobile part receives this signal during its next frequency sweep and since it is accompanied by the identification code from the identification generator 107 it can recognize this signal as a signal coming from the associated fixed part and react in the manner described above in detail in conjunction with the corresponding mode of operation.

Having described how a communication desired from the fixed part is established with the mobile part, the operations will now be described which take place when a telephone call is to be made with the aid of the mobile part.

When a subscriber wants to conduct a telephone call from the mobile part he must first actuate the cradle switch 166 so that the control circuit 136 is informed of the wish that a telephone communication be established. Before actuation of the cradle switch 166 the control circuit 136 was continuously monitoring the signal applied to this input 142 to establish whether it indicates that the output signal of the AM demodulator 138 has exceeded the threshold value of the Schmitt trigger 140. This exceeding was the indication of the reception of a channel frequency. If however a telephone communication is to be established from the mobile part the control circuit 136, as explained above in conjunction with the fixed part, must first search the predetermined frequency range for a free frequency. This is also done in that the signal applied to the input 142 is examined to determine whether it indicates no reception for a predetermined period. During the search of the frequency range for a free frequency the charging circuit 146 is set in operation by the control circuit 136 in each case only for a short time so that it generates at the storage member 152 a staircase voltage which tunes the controllable oscillator 120 intermittently and not continuously. In this intermittent frequency sweep the successively set frequency values each remain constant at least for a time of 100 ms so that each frequency can be tested to determine whether it is free or occupied. If the signal at the input 142 indicates during the test time of 100 ms that no channel frequency is being received at the antenna 100 it means that the corresponding frequency is free. Thereupon, the control circuit 136 no longer sets the charging circuit 146 in operation so that the frequency value reached at the controllable oscillator 120 is not further changed. By emitting a corresponding signal at the output 192 the control circuit 136 then closes the switches 180 and 190 and activates the identification generator 172 by means of a signal emitted by the output 178 so that the output signal of the reference oscillator 170 modulated with the identification code after a frequency conversion in the mixer 182 is transmitted by the antenna 188. The frequency of the signals transmitted by the antenna 188 differs exactly by the oscillating frequency of the reference oscillator 133, i.e. by the duplex interval of 45 MHz, from the frequency to which the reception section was set when the unoccupied channel was detected.

If due to ageing of the frequency determining components in the reference oscillator 170 in the mobile part the duplex interval of 45 MHz changes this change can be reduced by a control loop which is formed by a cooperation of the mobile part with the fixed part. A change of the duplex interval leads in the reception section of the fixed part to the intermediate frequency furnished by the IF filter 24 being shifted. The FM demodulator 28, which on reception of a signal having the correct intermediate frequency from the IF filter 24 furnishes a signal with a predetermined desired value, for example the voltage value OV, reacts to the reception of a signal with shifted intermediate frequency by furnishing at the output 44, a voltage value deviating from the desired value obtained. This voltage can be applied to the reference oscillator 103 at the input 102 and effects a shifting of the oscillation frequency in a direction which opposes the detected shift of the duplex interval. The shift of the oscillation frequency of the reference oscillator 103 leads to a shift of the frequency which is emitted by the antenna 125 and which is received by the antenna 110 of the mobile part and defines the frequency to which the controllable oscillator 120 is set. Finally, due to the frequency shift the frequency generated by mixing with the output frequency of the reference oscillator 170 is also changed so that the deviation detected of the duplex interval from the correct value of 45 MHz is counteracted.

As is apparent, the reception part contains no means to ensure that the frequencies at which the search for an unoccupied channel is carried out correspond exactly to the particular defined channel frequencies. By the choice of the frequency range of the oscillator 120 and of the variation range of the voltage used for the control thereof it is merely ensured that the particular reception frequency set lies within the range of the channel frequencies. In addition, the reference oscillator 133 ensures that the frequency emitted by the antenna 188 lies at the duplex interval of 45 MHz from the respective set reception frequency. The manner in which the mobile part is set exactly to a channel frequency during the establishment of the communication between the mobile part and the fixed part will be apparent from the following description.

When the mobile part transmits at the antenna 188 a signal frequency modulated with the identification code and lying in the frequency range of the channel frequencies, said signal is received at the antenna 10 of the fixed part. The fixed part receives the signal at the antenna 10 whilst it is in the rest state and carrying out search operations for occupied channels as described in detail above. As soon as the signal is received at the antenna 10, in the fixed part the control circuit 36 sets the charging circuit 46 out of operation so that the reception section remains set to the particular frequency received. By closure of the switch 58 the reception frequency is held constant, as likewise already explained. As is explained above, the control circuit 36 is informed of the value which the reception frequency has at that moment. In particular, it can recognize that the frequency just being received does not correspond exactly to a channel frequency. In the control circuit 36 digital signal values are stored which correspond to the voltage values which the storage member 62 furnishes whenever the fixed part is tuned exactly to the reception of a channel frequency. Using the comparator 93 or the analog/digital converter 94 the control circuit 36 can determine which signal value stored therein belongs to the voltage at the output of the storage member 65 at that moment or is closest to said voltage. This signal value then represents the channel frequency coming closest to the frequency being received at that moment. After carrying out this comparison operation the control circuit 36 actuates the switch 68 and sets the variable divider 84 of the PLL circuit to a value which results in the reception section being tuned exactly to the channel frequency closest to the frequency being received at that moment.

After the tuning of the reception section to the channel frequency lying closest to the particular frequency being received the fixed part firs' examines whether the channel frequency set is a free frequency. For this purpose, the examination operation outlined in detail above is employed. To prevent this examination from being disturbed by the frequency transmitted by the mobile part, during the establishment of the communication the mobile part transmits the signal modulated with the identification code only briefly for a time which suffices for the fixed part to receive said signal and after recognition of the identification code to react in the manner outlined above. Once the fixed part has determined that the intended reception frequency is occupied the control circuit switches the division ratio in the variable divider 84 so that the reception section is tuned to the next channel frequency. There is then again an examination whether this reception frequency is free or occupied. This operation is continued until a free frequency is found.

As soon as the control circuit 36 has recognized a free frequency it activates the identification generator 107 so that the frequency furnished by the reference oscillator 103 is modulated with the identification code.

The reference oscillator 103 oscillates with the frequency 34.3 MHz which is equal to the value of the duplex interval minus the intermediate frequency. By closure of the switches 111 and 119 by means of the signal emitted at the output 121 the control circuit effects that the output frequency of the oscillator 20 and the output frequency of the reference oscillator 103 are supplied to the mixer 115. Since the output frequency of the reference oscillator 103 is equal to the duplex interval minus the intermediate frequency, the frequency transmitted by the antenna 125 differs by the duplex interval of 45 MHz from the frequency to the reception of which the reception section of the fixed part is set.

As mentioned above, at the start of establishing the communication with the fixed part the mobile part transmitted the signal modulated with the identification code only for a short time which has enabled the fixed part to recognize the wish for a communication to be established and to react with the transmission of an exact channel frequency. After the momentary transmission of the signal modulated with the identification code the mobile part returns to the rest state in which it searches the predetermined frequency range to determine whether a certain signal intended for it, i.e. modulated with the identification code, is being transmitted by the fixed part. Since the fixed part is meanwhile transmitting a signal modulated with the identification code and having a channel frequency kept constant by the PLL circuit, the reception section of the mobile part can receive this channel frequency with the identification code at the antenna 110.

The FM demodulator 128 demodulates the signal received and supplies the demodulated identification code to the input 134 of the control circuit 136. The control circuit recognizes this identification code and thereupon closes the switch 158 so that the frequency control loop becomes active and keeps the output frequency of the controllable oscillator 120 constant. By the setting of the output frequency of the controllable oscillator 120 in that the reception section is tuned to the reception of an exact channel frequency it is also achieved that the frequency emitted by the antenna 188 corresponds exactly to the duplex frequency of the respective channel associated with the reception frequency.

As apparent from the above description of the cooperation of fixed part and mobile part, the latter can be constructed from relatively inexpensive components because it does not require any special assemblies which permit it to transmit independently exact channel frequencies. The exact adjustment to a channel frequency does not take place until the fixed part has transmitted an exact channel frequency back which is then employed by the mobile part using a frequency control loop as reference frequency for the exact adjustment to the channel frequency.

When the radio communication has been established between the mobile part and the fixed part the control circuit 136 in the mobile part frees a dialing signal generator 196 by means of a signal emitted by the output 195 of the control circuit 136 so that the output signals of said generator 196 can be transmitted to the fixed part. The dialing signals correspond to the telephone number dialed via keys which are not illustrated by the user of the mobile part. The fixed part receives the dialing signals and after decoding them passes them to the exchange line. When the communication with the called subscriber is then established the user of the mobile part can speak to the called subscriber through the microphone 176 disposed in the mobile part.

In a practical example of embodiment the mobile part is so constructed that it can receive the frequencies of 959.0125 to 959.9875 MHz associated with the channels 1 to 40 and transmit the associated duplex frequencies of 914.0125 to 914.9875 MHz. The controllable oscillator 120 can be controlled by means of the voltage applied to its input 122 in such a manner that it emits frequencies between 361.10417 and 361.42917 MHz. After the frequency triplication in the frequency multiplier 135 frequencies in the range of 1083.3125 and 1184.2875 MHz are supplied to the mixer 116 from which results by mixing with the received channel frequency an intermediate frequency of 124.7 MHz. The reference oscillator 170 furnishes a frequency of 169.3 MHz. To enable the mobile part for example to receive the channel frequency of 959.4875 MHz associated with the 20th channel the controllable oscillator 120 must oscillate with the frequency 361.2625 MHz so that after triplication of this frequency and mixing in the mixer 116 the intermediate frequency 124.3 MHz results. By mixing the tripled frequency from the oscillator 120 with the oscillation frequency of the reference oscillator 170 the frequency 914.4875 MHz results at the output of the mixer 182. These numerical values are of course only examples and the principle described for establishing a communication between the fixed part and the mobile part of a cordless telephone can be employed with other frequencies as well.

As apparent from the above description in the rest state of the mobile part the tuning of the reception section to predetermined reception frequencies is effected by the output of the controllable oscillator 120 being varied by means of a control voltage applied to its input 122 over a predetermined range. It was assumed that the output frequency of the oscillator 120 varies from a predetermined initial value to a predetermined final value when the control voltage also varies from a predetermined initial value to a predetermined final value. Since however the frequency-determining components in the controllable oscillator 120 because of changing ambient conditions or because of aging can change their frequency/voltage characteristic it may happen that the output frequency range of the oscillator 120 shifts although the control voltage range remains unchanged. This shifting of the frequency range may be so great that a portion of the frequency range in which the possible 40 channel frequencies lie is no longer completely covered when the mobile part executes the search operation for channel frequencies in the rest state. This undesirable shifting of the reception frequency range can be avoided by using the calibration operation described in detail below.

The control voltage used to vary the output frequency of the controllable oscillator 120 is generated as charging voltage of the capacitor forming the storage member 152 in that said capacitor is charged with the aid of the charging circuit 146 formed by a constant current source. The value of the resulting charging voltage depends solely on the operating time of the charging circuit 146 because, as explained, this charging circuit supplies a constant current to the storage member 152. Thus, the control voltage generated by the storage member 152 varies from the value $U_1$ to the value $U_2$ when charging circuit 146 is in operation from the instant $t_1$ to the instant $t_2$. The control voltage values $U_1$ and $U_2$ are fixed when the mobile part is operated for the first time so that with the variation of the control voltage from the value $U_1$ to the value $U_2$ the output frequency of the controllable oscillator 120 varies so that the entire range of the channel frequencies can be received by the reception section of the mobile part.

As mentioned, however, the frequency/voltage characteristic of the frequency-determining components in the controllable oscillator may vary so that even when the control voltage range is kept constant the reception frequency range is shifted. To provide possible compensation, it must first be ensured that the control voltage range can be varied. The first step is to ensure that by the cooperation of the charging circuit 146 with the storage member 152 a control voltage range is generated which is greater than the range necessary for the reception of all the channel frequencies. This greater control voltage range tunes the reception section so that it can also receive frequencies below and above the predetermined channel frequency range. By a further provision the control circuit 136 ensures that only the reception frequency range in which channel frequency values lie is evaluated.

This provision resides in that the control circuit 136 evaluates the output signal of the Schmitt trigger 140 only during a predetermined time interval $\Delta T$ which has been determined as the time interval in which the control voltage varies from the value $U_1$ to the value $U_2$, i.e. between the two values which define the desired reception frequency range. In a concrete examp,le it will be assumed that the charging circuit 146 is set in operation at instant $t_0$ so that it starts to supply a constant current to the storage member 152. As soon as the control voltage value $U_1$ which effects that the reception section of the mobile part is tuned to the reception of the frequency of the first channel has been reached the control circuit 136 begins to evaluate the output signals of the Schmitt trigger 140 supplied to its input 142. The instant of the start of the evaluation will be assumed to be the time $t_1$. The control voltage at the output 162 of the storage member 152 continues to change until at the instant $t_2$ it reaches the value $U_2$ which leads to the tuning of the reception section of the mobile part to the reception of the frequency of the channel 40. From this time $t_2$ on the control circuit 136 ignores the output signals of the Schmitt trigger 140. The control circuit 136 thus evaluates the output signals of the Schmitt trigger 140 only during the interval between the time $t_1$ and the time $t_2$. It is apparent that by varying the evaluation time interval $\Delta T$ the particular reception frequency range evaluated can also be varied. By displacing the evaluation time interval the frequency range can be shifted towards higher or lower frequencies and by varying the duration of the evaluation time interval the width of the frequency range can be increased or diminished.

A calibration method will now be described with the aid of which the evaluation time interval $\Delta T$ can be adapted to changes of the frequency/voltage characteristic of the frequency-determining components in the controllable oscillator 120. In this calibration operation as reference frequencies frequencies transmitted by the fixed part are used which because of the use of the PLL circuit present in the fixed part can have very accurate and constant values. Since it may be assumed that the frequency/voltage characteristic of the frequency-determining components in the controllable oscillator 120 of the mobile part only changes when considered for relatively long periods of time, it suffices to carry out the calibration operation automatically once at relatively large intervals of time, for example every two hours. There are, however, situations in which it is found necessary to carry out a calibration in addition to the periodically executed calibration operations. For a displacement of the frequency/voltage characteristic of the frequency determining components in the oscillator 120 of the mobile part can take place not only over longer periods of time but due to temperature changes also be caused within relatively short times. If, for example, the mobile part is brought from a warm room to a cold room the oscillator frequency may be shifted and this leads to an unacceptable change of the transmission and reception frequency ranges. To provide a remedy in this case the mobile part may include a temperature sensor with the aid of which the particular ambient temperature can be measured. The control circuit 136 can monitor the temperature measured by the temperature sensor to determine whether a predetermined fluctuation range is exceeded. If the control circuit 136 detects that this fluctuation range has been exceeded it automatically initiates a calibration operation of the type described. By means of a suitable switching pulse the calibration operation could be initiated whenever the mobile part is set in operation again after not being used for a relatively long period.

In the course of the calibration operation, in a sequence still to be explained the fixed part first transmits as initiation of the calibration operation a signal modulated with the identification code and a specific calibration code and having a frequency lying substantially in the middle of the frequency range, i.e. for example with the frequency of the channel 20, and thereafter signals with the frequencies of the channels 1 and 40 are transmitted which are also modulated with the identification code and the calibration code. Before the transmission of these signals begins the fixed part examines in the manner described in detail above whether the corresponding frequencies are free. If the fixed part finds that one of these frequencies is occupied it does not perform the calibration operation but repeats the determination of the free frequencies at periodic intervals of for example 5 minutes until it finally finds all three required frequencies to be free. The time displacement is of no consequence because as mentioned above the characteristic variations to be compensated are long-time variations.

It will now be assumed that the fixed part has recognized the three frequencies required to be free. It then transmits the signal with the frequency of the channel 20 which is modulated with the indentification code and with a specific calibration code. The mobile part receives this signal whilst it is performing in its rest state the periodically conducted search for channel frequencies. As soon as the mobile part has received the signal and recognized the identification code and the calibration code it is informed that a calibration operation is to be carried out. On the associated duplex channel the mobile part sends back to the fixed part a confirmation signal that tells the fixed part that the mobile part is now ready to carry out the calibration operation. With the transmission of the confirmation signal the control circuit 136 of the mobile part also sets the charging circuit 146 in operation so that the latter begins to charge the storage member 152 so that the control voltage applied by said member to the controllable oscillator 120 begins to rise from the voltage value 0.

Simaltaneously with the initiation of the operation of the charging circuit 146 the control circuit 136 starts a time counter whose count always provides indication of the time which has elapsed from the start of operation of the charging circuit 146.

With the reception of the confirmation signal the fixed part begins to transmit a signal with the frequency of the channel 1 which is modulated with the identification code and the calibration code. As soon as the mobile part has been tuned by the control voltage furnished by the storage member 152 to the reception of the frequency of the channel 1 the Schmitt trigger 140 passes to the control circuit 136 the signal which shows the reception of the frequency of the channel 1 and which results in the interruption of the operation of the charging circuit 146. At the same time, the time counter contained in the control circuit 136 is stopped and the count reached since the start of operation of the charging circuit 146 is stored. The control circuit 136 then examines whether the received signal is modulated with the identification code and the calibration code; if it is, the control circuit 136 sets the circuit 146 in operation again so that the control voltage furnished by the storage member 152 continues to rise from the value reached. The value reached on reception of the signal with the frequency of the channel 1 is the aforementioned voltage value $U_1$ which represents the lower end point of the frequency/voltage characteristic of the frequency-determining components in the controllable oscillator 120.

Simultaneously with the renewed setting into operation of the charging circuit 146 and the time counter in the control circuit 136 the evaluation of the output signal of the Schmitt trigger 140 becomes ineffective for a period of time which is slightly shorter than the period of time which the charging circuit 146 must normally be in operation for the reception section of the mobile part to be tuned through the entire frequency range to be received. In the example outlined above for the total duration the value $\Delta T \approx 30$ ms was assumed. In this example the control circuit 136 interrupts the evaluation of the output signal of the Schmitt trigger 140 for a duration of for example 9 to 9.5 ms. This means that the control circuit 136 during the tuning sweep in operation does not respond to signals which are received during the sweep operation and have frequencies of the channels 2 to about 37 or 38.

After the fixed part has transmitted the signal with the frequency of the channel 1 for a duration which has permitted the mobile part to receive and evaluate this signal, it transmits a signal with the frequency of the channel 40 which is modulated with the identification code and the calibration code. It is pointed out in this connection that the transmission of the signals with the frequencies of the channels 20, 1 and 40 by the fixed part is for the performance of a calibration operation with cooperation of the PLL circuit contained in the fixed part and this means that the control circuit 36 before the start of the calibration operation has switched the switch 68 into the position illustrated in dashed line. The signal transmitted by the fixed part with the frequency of the channel 40 is received by the mobile part as soon as the reception section has been tuned by the control voltage furnished by the storage member 150 to the reception of the corresponding frequency. The control circuit 136 has meanwhile started evaluation of the output signal of the Schmitt trigger 140 so that on reception of the signal with the frequency of the channel 40 it interrupts the operation of the charging circuit 146. The time counter is also stopped and the count reached stored. The control voltage at the storage member 152 reached on tuning the reception section to the frequency of the channel 40 is the aforementioned voltage $U_2$ which represents the end value of the voltage range which is necessary to tune the reception section through the entire predetermined frequency range.

In the control circuit 136 two counts are now stored, one of which represents the duration for which the charging circuit must be in operation to tune the reception section of the mobile part to the reception of the frequency of the channel 1 whilst the other represents the duration which the charging circuit 146 must be in operation for the reception section to be tuned to the frequency of the channel 40. The difference of the two times represehts the time interval $\Delta T$ in the course of which the reception section of the mobile part is exactly tuned to the range of the frequencies of channel 1 to channel 40. In this manner the control circuit 136 has obtained information on the interval in which during every operating cycle of the charging circuit 146 a tuning of the reception section to the desired frequency range is given and on the basis of this information it can ensure that the output signal of the Schmitt trigger 140 is evaluated only during this time interval. It can do this quite simply in that during each operating cycle of the charging circuit 146 the aforementioned time counter is also running and that the evaluation of the output signal of the Schmitt trigger 140 is carried out only between the two counts stored during a preceding calibration cycle.

Since in each calibration cycle the time interval $\Delta T$ is redefined it is always ensured that the reception section of the mobile part is tuned through the entire range of the channel frequencies even when the frequency/voltage characteristic of the frequency-determining components of the controllable oscillator 120 has changed. This shows that the mobile part can be made very simply with inexpensive components because exact frequency-determining components and assemblies are not necessary.

Figure 2:
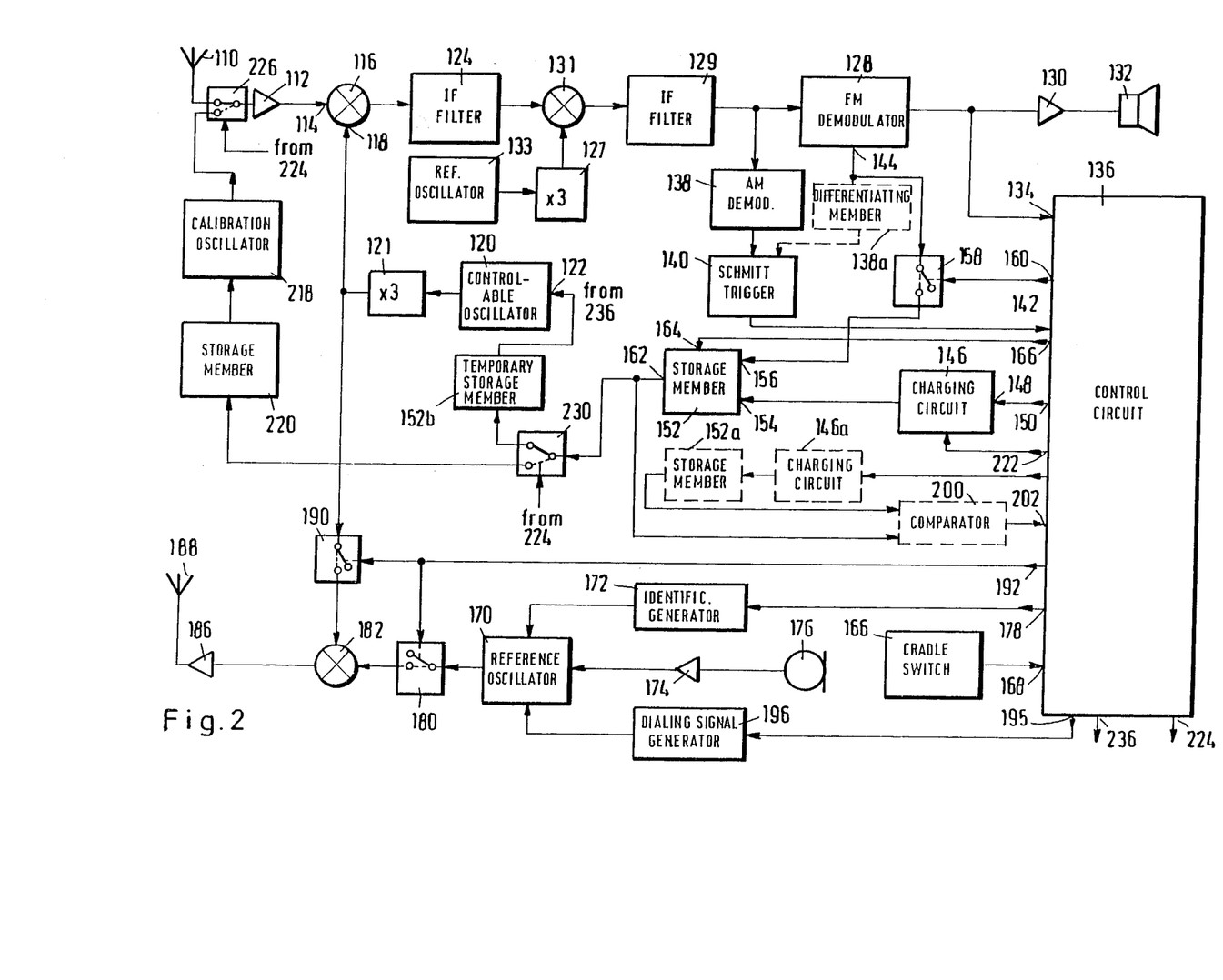
FIG. 2 is a block circuit diagram of the mobile part of a cordless telephone.

In the previous description it has been assumed that the mobile part illustrated in FIG. 2, when a telephone communication is to be established therewith, first transmits any frequency within the predetermined frequency range. The adjustment to an exact channel frequency does not take place until the fixed part reacts to the reception of any frequency with the transmission of an exact channel frequency which is then used by the mobile part as reference frequency so that its transmission part can, utilizing a frequency control loop, then adjust itself fixedly to this exact channel frequency. If it is not permitted by the authorities to transmit any frequencies which can lie between the frequencies associated with the channels in the frequency range defined for operation of the cordless telephone, this problem can be solved with a simple means. For example, for this purpose in the control circuit 136 for each channel frequency a count is permanently stored. For tuning of the mobile part to this channel frequency the charging circuit 146 is supplied with a number of pulses corresponding to the count which set the charging circuit 146 in operation and effect that the storage member 152 generates at its output a corresponding control voltage for the oscillator 120 which thereupon emits the frequency associated with the channel frequency. By the charging circuits 146 and the storage member 152, as with a digital/analog converter, the count stored in the control circuit 136 is converted to an analog control voltage. Via the input 156 in the manner already outlined above in detail the control voltage furnished by the storage member 152 can be varied so that the mobile part is held fixedly tuned to the desired frequency.

The signal applied to the input 156 of the storage member 152 acts as if the control circuit 136 had changed the count stored therein.

A further calibration operation will now be described with the aid of which it can be ensured that the mobile part is tuned exactly to the desired channel frequencies even when the frequency/voltage characteristic of the frequency determining components in the controllable oscillator 120 has changed.

For this purpose the mobile part includes a comparator 200 which compares the output voltage of the storage member 152 with the output voltage of a further storage member 152a which, like the storage member 152, is driven by its own charging circuits 146a. The output signal of the comparator 200 is applied to the control circuit 136 and evaluated by the latter in the manner still to be described. Storage member 152a, charging circuit 146 and comparator 200 are shown in FIG. 2 in broken lines in order to make clear that these units are only contained in the circuit when the calibration operation to be described is to be made possible.

When the output voltage of the storage member 152 generated by the use of pulses from the control circuit 156 has a value such that the controllable oscillator 120 tunes the mobile part exactly to a channel frequency, the build-in frequency control loop following the response of the Schmitt trigger 140 does not apply any correction voltage to the input 156 of the storage member 152 when the corresponding channel frequency is received by the fixed part so that the output voltage thereof remains unchanged. Upon response of the Schmitt trigger 140 control circuit 136 examines whether the number of pulses emitted so far lies within the range of one of the counts stored in the control circuit and associated with a channel frequency. If this is true, the received frequency is regarded as reference frequency for the calibration operation to be described. The charging circuit 146a and the storage member 152a are driven with pulses from the control circuit 136, i.e. act like an additional control voltage generator. As soon as comparator 200 detects identity of the output voltages of both storage members, it furnishes a corresponding signal to the control circuit 136. The control circuit 136 therefore takes over the number of pulses applied to the charging circuit 146a as count associated with the received channel.

This also applies when the frequency/voltage characteristic of the controllable oscillator 120 has changed. In this case the mobile part is tuned to a frequency which does not exactly correspond to the associated channel frequency emitted by the fixed part. The FM demodulator 128 therefore generates at its output 144 a correction voltage which is applied to the input 156 of the storage member 152 and changes the output voltage thereof such that in the manner of an automatic frequency control the correction voltage is made zero.

The control circuit 136 in this calibration operation not only takes over the count obtained which is associated with the channel frequency to which the mobile part is tuned at that moment, but simultaneously also updates all the other counts associated with the further channel frequencies which operation thus represents a calibration of the frequency/voltage characteristic of the oscillator 120 by which displacements of this characteristic due to temperature or ageing are continuously compensated.

In the operation outlined it is assumed that the frequency/voltage characteristic of the oscillator 120 is linear, i.e. on detection of a shift of this characteristic all the counts stored in the control circuit 136 are changed in similar manner for compensation purposes. However, as a rule the frequency/voltage characteristic of the oscillator 120 is not linear which means that the counts which are stored for channel frequencies in various sections of the total frequency range must be modified in different manner. To take account of this fact the entire channel frequency range is divided into three sections which include the channels 1 to 13, 14 to 26 and 27 to 40. If, for example, in the middle section a displacement of the characteristic is detected which makes necessary a modification of the corresponding count by 2 the control circuit 36 changes the counts for the section of the channels 27 to 40 by 4 and for the section of the channels 1 to 13 by 1. In this manner account is taken of the non-linearity of the characteristic.

It is particularly emphasized that as reference frequency for carrying out the calibration operation outlined any channel frequency which the mobile part receives in the course of the calibration operation can be used. This channel frequency can also originate from fixed stations of other telephone subscribers or from their mobile parts. It is assumed that the transmitting fixed or mobile parts in operation always transmit the exact channel frequencies which can be used as reference frequencies for calibration purposes. This applies in particular of course to the channel frequencies emitted by fixed stations which due to the use of PLL circuits correspond exactly to the prescribed values.

A further possibility of calibrating the mobile part resides in providing a separate calibration oscillator 218 and using it in a special calibrating operation in the manner described below. When this possibility is used the storage member 152a, the charging circuit 146a and the comparator 200 become superfluous. The calibrating oscillator 218 comprises as frequency determining component a surface wave resonator whose resonance frequency can be set with the aid of a capacitance diode. As frequency determining component also a crystal device can be used adjustable to a desired oscillation frequency by means of a variable capacitance diode. To fix the capacitance of the capacitance diode in the calibration oscillator 218 the control circuit 136 furnishes at the output 222 a number of pulses stored in a counter which like the pulses from output 150 by charging circuit 146 and by storage member 152 are converted to a tuning voltage which is applied to the capacitance diode in the calibration oscillator 218. Under the control of a signal furnished by the output 224 of the control circuit 136 a changeover switch 226 inserted into the connection between the antenna 110 and the amplifier 112 can be actuated in such a manner that instead of the signal received by the antenna 110 the output signal of the calibration oscillator 218 can be applied to the amplifier 112. In this calibration operation the switch 230, intermediate storage member 152b and storage member 220 are used as additional units. The switch 230 controlled by the signal from the output 224 of control circuit 236 can apply the output voltage of the storage member 152 selectively to the intermediate storage member 152b or to the storage member 220.

For calibration of the calibration oscillator 218 the following steps are taken.

For the purpose of calibration the control circuit 36 of the mobile part first causes the emission of the exact frequency of channel 5 and it simultaneously adds a code group to the transmitted signal which code group informs the mobile part that a calibration operation is to be carried out. Channel 5 is only taken as an example; a frequency associated with another channel could also be transmitted, but the emission of a frequency in the lower frequency range is advantageous, since less time is then needed for the calibration operation. The mobile part receives the frequency associated with channel 5 in the course of a search operation and the reception section of said mobile part is tuned to this frequency in the usual manner, the delivering of pulses at output 150 of the control circuit 136 being interrupted as soon as the Schmitt trigger 140 has furnished the output signal indicating signal reception. By furnishing a signal at output 160 control circuit 136 closes switch 158 so that a frequency correction signal from FM demodulator can be applied to storage member 152, if necessary. Via switch 230 the intermediate storage member 152b is charged to the same voltage that the storage member 152 furnishes at output 162. By means of the output signal of the intermediate storage member 152b the controllable oscillator 120 is maintained tuned to the frequency required for receiving channel 5.

By recognition of the code group characterizing the calibration operation the control circuit 136 is caused to furnish a signal at output 224 which signal brings switch 226 into the switching position shown in a broken line in which the reception section of the mobile part no longer receives the signal from antenna 10 but the output signal of calibration oscillator 218. The signal from output 224 also switches the switch 230 into the switching position shown in broken lines, so that output 162 of storage member 152 is connected to the input of storage member 220. Controllable oscillator 120 now as before is maintained tuned to the frequency previously set, since now the intermediate storage member 152b applies the corresponding control voltage to its input 122.

Control circuit 136 at its output 222 then furnishes pulses to charging circuit 146 which pulses generate a voltage at storage member 152 which reaches the calibration oscillator 218 via the storage member 220 and controls the oscillation frequency of said oscillator. By the continued furnishing of pulses at output 222 the oscillation frequency of calibration oscillator 218 is changed for a duration until the reception section, which had been tuned to channel 5 via the controllable oscillator 120, indicates reception of the frequency associated with channel 5 by a response of the Schmitt trigger 140. The number of pulses furnished at output 222 up to the response of Schmitt trigger 140 is stored as reference count in the control circuit 136, which count can be reverted to for carrying out a later yet to be described calibration operation relating to the controllable oscillator 120. Following the storing of the reference count the control circuit 136 knows that it can tune the calibration oscillator 218 exactly to a frequency enabling reception of channel 5 by furnishing a number of pulses at output 222 corresponding to this reference count. The calibrating operation outlined is automatically carried out by the fixed part at relatively large intervals of time, for example, every two to four hours , so that it is always ensured that the calibration oscillator 218 oscillates with the correct frequency.

By use of the calibration oscillator 218 it can also be ensured that changes in the voltage /frequency characteristic of the controllable oscillator 120 due to external influences, for example temperature changes or ageing, do not result in a shift of the operating frequency range of the mobile part. For this purpose the control circuit 136 switches switch 230 in such a manner that the output signal of the storage member 152 is applied to storage member 220. The control circuit 136 then furnishes to the charging circuit 146 at output 222 the number of pulses associated with channel 5 and determined by the reference count ascertained by means of the above-explained calibration operation. This leads to the generation of a corresponding voltage at the output of storage member 152 which voltage via switch 230 and storage member 220 tunes the calibration oscillator to the frequency associated with channel 5.

As next step the control circuit 136 switches switch 226 in such a manner that the output signal of the calibration oscillator 218, that means the signal having the frequency of channel 5, is applied to amplifier 112. Switch 230 is also brought into the switching position which is shown in a solid line. The voltage stored in storage member 220 keeps the calibration oscillator 218 tuned to the frequency of channel 5 for a short period of time having at least the duration of the calibration operation to be carried out.

The tuning of the reception section in the mobile part is effected in the same manner as already described above several times; the controllable oscillator 120 is set as usual to the oscillation frequency permitting reception of channel 5. The tuning of the controllable oscillator 120 is obtained by supplying pulses to the charging circuit 146 and by a corresponding charging of the storage member 152. The control circuit 136 is thus informed of the number of output pulses which were necessary at the output 150 to obtain the tuning to channel 5. This number of pulses can be used by the control circuit 136 as reference count with the aid of which it can be determined how many pulses must then be furnished at the output 150 for tuning the mobile part to other channels. For example, assuming a linear voltage/frequency characteristic of the oscillator 120 it will be supposed that the control circuit 136 must furnish for the tuning to the channel 1 ten pulses and for each next higher channel ten further pulses up to finally 400 pulses for channel 40. This association of the pulse numbers with the channels originally made by the manufacturer no longer applies when a characteristic shift takes place and it thus occurs that in a subsequent calibration operation it is found that for the tuning to the reception of channel 5 52 pulses must be furnished to the charging circuit and not 50 pulses. Only after emission of 52 pulses does the storage member 152 generate a control voltage for the oscillator 120 such that the latter sets the reception section of the mobile part to the channel 5. As mentioned, the correct setting to the reception of the channel 5 is recognized by emission of a pulse from Schmitt trigger 140. The control circuit 136 recognizes that the association of the necessary pulses to the channel frequencies must be changed and it effects a change in the association by increasing the stored pulse numbers in each case by 2 so that for example for tuning to channel 40 402 pulses must be furnished and not 400. The shift of the frequency/voltage characteristic of the oscillator 120 is compensated in this manner. To take account of a non-linear frequency/voltage characteristic the aforementioned division can be made of the frequency range into three sections in which the pulse numbers stored as counts are modified in different manner.

The calibration operations described above can be carried out periodically at fixed intervals of time or whenever the mobile part is set in operation after not being used for some time. When using the calibrating operations outlined it is no longer necessary to employ in the mobile part expensive frequency determining components for example PLL circuits to obtain longtime constancy. Characteristic variations of the frequency determining components are compensated in simple and reliable manner by these calibration operations.

In the mobile part due to the calibration operations outlined it is always ensured that accurate counts are stored which indicate the number of pulses which must be furnished at the output 150 of the control circuit 136 for a tuning to a desired channel frequency to occur. When the mobile part carries out in the rest state a search operation it interrupts the latter whenever at the antenna 110 a high-frequency signal is received which lies in the operating frequency range of the mobile part. This stopping is also effected when a frequency is received which lies outside the raster of the prescribed channel frequencies. Since such frequencies are not accompanied by an identification code the search operation is then immediately continued. The stopping leads however to a possibly undesirable delay of the search operation. By a simple step it can be ensured that the mobile part only interrupts its search operation when it has received a frequency which corresponds to a channel frequency or at least lies close to such a frequency. Since in the control circuit 136 for each channel frequency a count is stored and the control circuit 136 also knows how many pulses it has already furnished in the course of a search operation at the output 150, by comparing the emitted pulses with the stored counts it can always be determined whether at that moment a tuning is present to a channel frequency or to a frequency close to such a frequency. In the control circuit 136 it can be ensured that a stopping of the pulse emission at the output 150 on reception of a high-frequency signal at the antenna 110 takes place only when a number of pulses has been furnished which is equal to a pulse number corresponding to a channel frequency or at least lies near such a pulse number. In this manner the control circuit 136 reacts with an interruption of the pulse emission at the output 150 only when the mobile part receives a frequency in a narrow frequency window containing a channel frequency. If the channel 30 is considered by way of example and in the control circuit 136 for this channel frequency the count 300 is stored then the control circuit 136 reacts to the reception of highfrequency signals by the mobile part only for as long as it emits for example 298 to 302 pulses at the output 150.

If for example after emitting 305 pulses a high-frequency signal is received at the antenna 110 although the Schmitt trigger 140 furnishes a corresponding pulse which indicates the reception of this signal the control circuit does not react to it with the interruption of the pulse emission at the output 150. After the emission of the 302nd pulse the control circuit 136 does not react again until the 308th pulse is emitted, the range of 308 to 312 pulses containing the pulse number 310 associated with the channel 31.

In a cordless telephone it can occur that two subscribers living close together with the aid of their respective mobile parts conduct telephone conversations when they are very close together, possibly in adjacent rooms. If the telephone calls are conducted in directly adjacent channels, for example utilizing the channels 18 and 19, this can lead to mutual interferences detrimental to the transmission quality. To avoid such interferences a different setting of the transmission powers and reception sensitivities can be made in the associated fixed parts and mobile parts. The transmitting power of the mobile parts is reduced so that the probability that mobile parts operated adjacent to each other interfere with each other is reduced. For compensating the reduced transmission power the reception sensitivity of the fixed parts is increased so that the same range is achieved which would have been present without reduction of the transmission power of the mobile part. The reduction of the transmission power in the mobile parts also has the advantageous effect that less energy is consumed so that a longer battery life is achieved.

I claim:

1. Cordless telephone comprising a fixed part which includes a reception section for receiving exact reception channel frequencies lying in a predetermined frequency range at equal intervals apart, and a transmission section for transmitting exact transmission channel frequencies lying at a predetermined duplex interval from the reception channel frequencies, and a mobile part which includes a reception section for receiving frequencies lying in the range of the transmission channel frequencies of the fixed part and a transmission part for transmitting frequencies lying in the range of the reception channel frequencies of the fixed part, characterized in that the mobile part (FIG. 2) includes a frequency control loop (116, 124, 131, 129, 128, 158, 152, 120, 121) which using the transmission channel frequency transmitted by the fixed part (FIG. 1) as reference frequency holds its reception section fixedly tuned to transmission channel frequency.

2. Cordless telephone according to claim 1 in which each frequency transmitted by the fixed part or the mobile part is at least intermittently accompanied by an identification gode and the fixed part and the mobile part in a rest state in successive search periods of predetermined duration are tuned in each case through the predetermined frequency range and the search operation carried out in each search period is stopped on reception of a frequency accompanied by the identification code, characterized in that the fixed part and the mobile part each contain a control voltage generator (46, 52; 146, 152) which in each search period with predetermined duration generates once, a control voltage varying over a predetermined voltage range fixedly associated with the range of the frequencies to be received by an oscillator, (20; 120) controllable in its output frequency; that a test circuit is provided which tests each channel frequency received to determine whether it is accompanied by the identification code, and that a control circuit (36; 136) is provided which stops the variation of the control voltage on reception of a channel frequency and renders the control voltage generator inoperative when the test circuit detects the presence of the identification code.

3. Cordless telephone according to claim 2, characterized in that the fixed part includes a controllable oscillator and a tuning voltage generator (70, 80, 84) adjustable by the control circuit (36) for producing a constant tuning voltage whose value corresponds to the voltage value delivered by the control voltage generator (46, 52) upon its interruption and that a switch (68) is provided which under the control of the control circuit (36) applies to the controllable oscillator (20) the constant tuning voltage instead of the control voltage.

4. Cordless telephone according to claim 2 characterized in that the control circuit (36; 136) is a microprocessor in which information is stored to correlate control, voltage values with reception channel frequencies, and information on the adjustments of the tuning voltage generator to be made to obtain desired tuning voltage values.

5. Cordless telephone according to claim 4, characterized in that the fixed part includes an analog/digital converter which converts the control voltage produced by the control voltage generator (46, 52) to a digital signal and supplies said signal to the microprocessor (36).

6. Cordless telephone according to claim 4 characterized in that the controllable oscillator (20) in the fixed part can be connected by the switch (68) to the tuning voltage generator (70, 80, 84) to form a PLL circuit which is adjustable by the microprocessor (36) for emitting various frequencies permitting reception of the various reception channel frequencies.

7. Cordless telephone according to claim 5 characterized in that the microprocessor (36) adjusts the tuning voltage generator (70, 80, 84) in dependence upon the digital signal which is supplied thereto on the interruption of the operation of the control voltage generator (46, 52) by the analog/digital converter (94) and applies the actuating signal to the switch (68).

8. Cordless telephone according to claim 7, characterized in that the microprocessor (36) sets the tuning voltage generator (70, 80, 84) sucessively for the emission of different tuning voltage values, and that a comparator (93) compares the tuning voltage values with the control voltage value present on interruption of the operation of the control voltage generator and on detecting identity supplies to the microprocessor (36) a signal for actuating the switch (58).

9. Cordless telephone according to any one of claims 2, 5, 6, or 8, characterized in that in the reception section of the mobile part and of the fixed part an FM demodulator (28;128) is contained which in the demodulation of a received channel frequency furnishes a frequency control signal and that the frequency control signal is applied to the control voltage generator (46,52;146;152) and influences the control voltage furnished by the latter to obtain a frequency control.

10. Cordless telephone according to claim 9, characterized in that in the transmission section of the fixed part a reference oscillator (103) is contained for defining the duplex interval between a reception channel frequency and the associated transmission channel frequency, the oscillation frequency thereof being influenceable by the frequency control signal furnished by the FM demodulator (28) in the reception section.

11. Cordless telephone according to claim 10, characterized in that the fixed part and the mobile part contain a differentiating member (38a, 138a) which differentiates the frequency control signal and that the output signal of the differentiating member (38a, 138a) is evaluated to detect the reception of a channel frequency.

12. Cordless telephone according to claim 10, characterized in that in the mobile part an additional control voltage generator (136a, 152a) is provided which is driven by the control circuit (136) and the output voltage of which is not influenceable by the frequency control signal, that for comparing the control voltage with the output voltage of the addition control voltage generator (146a, 152a) a comparator (200) is provided, that in the control circuit (136) for each channel frequency to which the mobile part can be tuned a characteristic parameter is stored, said characteristic parameter defining the frequency to which the mobile part can be tuned by driving the control voltage generator (146, 152) by the control circuit (136), and that the characteristic parameters associated with the channel frequencies can be adjusted for calibrating the mobile part in dependence upon the result of the comparison carried out by the comparator (200).

13. Cordless telephone according to claim 12, characterized in that the characteristic parameters are counts which define the number of pulses with which the control voltage generator (146, 152) must be driven in order to tune the mobile part to the channel frequency associated with the respective count.

14. Cordless telephone according to claim 13, characterized in that the mobile part includes a calibration oscillator (218) which is adjustable in its oscillation frequency by the control circuit (136) and the output signal of which can be applied instead of a signal received by the fixed part to the input of the reception section of the mobile part.

15. Cordless telephone according to claim 14, characterized in that the calibration oscillator (218) comprises as frequency-determining component a surface wave resonator.

16. Cordless telephone according to claim 14, characterized in that the calibration oscillator (218) comprises as frequency determining component a crystal component, the oscillating frequency of which being adjustable by means of a variable capacitance diode.

17. Method for defining the oscillation frequency of the calibration oscillator in the mobile part of a cordless telephone according to claim 15 characterized in that the fixed part transmits a predetermined calibration channel frequency which corresponds to the desired oscillation frequency of the calibration oscillator (218), that the mobile part is tuned to the calibration channel frequency and held tuned, that to the input of the reception section of the mobile part the output signal of the calibration oscillator (218) is applied, that then the frequency of said output signal is set so that it corresponds to the calibration channel frequency and that for reproduceable adjustment of the oscillation frequency of the calibration oscillator (218) a characteristic parameter is stored in the mobile part.

18. Method for calibrating the operation frequency range of the mobile part of a cordless telephone upon carrying out the method of claim 17, characterized in that to the input of the reception section of the mobile part the output signal of the calibration oscillator (218)

is applied having the calibration channel frequency, that the mobile part is tuned for the reception of the calibration channel frequency from the calibration oscillator (218) and that the characteristic parameter resulting from this tuning operation is taken as a basis for updating the characteristic parameters stored in the mobile part and assigned to the other channel frequencies.

19. Cordless telephone according to any one of claim 14 characterized in that the transmission power of the mobile part is less than that of the fixed part and that the reception sensitivity of the fixed part is greater than that of the mobile part.

20. Method of establishing a communication between the fixed part and the mobile part of the cordless telephone according to the preceding claim, 14 characterized in that to initiate establishment of a communication by a call initiated by the mobile part the latter firstly transmits an arbitrary frequency accompanied by the identification code and lying within the predetermined frequency range, that the fixed part after receiving said arbitrary frequency and recognizing the identification code transmits an exact transmission channel frequency accompanied by the identification code and that the frequency control loop of the mobile part after receiving the transmission channel frequency and recognizing the identification code holds the reception section of the mobile part fixedly tuned to the received frequency.

21. Method according to claim 20, characterized in that the fixed part transmits after reception of the arbitrary frequency and detection of the identification code an exact channel frequency as close as possible to the arbitrary frequency and that the mobile part for tuning to the channel frequency emitted by the fixed part carries out a sweep of its reception section through a section of the predetermined frequency range which includes some channel frequencies lying above and below the received channel frequency.

22. Radio communications system operating in duplex mode comprising at least one main station and at least one extension, characterized in that the main station (s) and the extension(s) have the features set forth in one of claim 14 for the fixed part and for the mobile part of a cordless telephone.

* * * * *